United States Patent [19]
Ruegenberg et al.

[11] Patent Number: 5,951,735
[45] Date of Patent: Sep. 14, 1999

[54] METHOD AND APPARATUS FOR CONNECTING TWO OPTICAL FIBERS BY ARC WELDING

[75] Inventors: Gervin Ruegenberg; Franz Drobner, both of Munich, Germany

[73] Assignee: Siemens Aktiengesellschaft, Munich, Germany

[21] Appl. No.: 09/045,948

[22] Filed: Mar. 23, 1998

[30] Foreign Application Priority Data

Mar. 26, 1997 [DE] Germany .......................... 197 12 780

[51] Int. Cl.⁶ .................................................. C03B 37/07
[52] U.S. Cl. .......................... 65/377; 65/407; 65/DIG. 4; 65/501; 65/509
[58] Field of Search ...................... 65/377, 407, DIG. 4, 65/509, 501

[56] References Cited

U.S. PATENT DOCUMENTS

| | | | |
|---|---|---|---|
| 4,514,615 | 4/1985 | Simoneoy | 219/130.21 |
| 4,936,960 | 6/1990 | Siefkes | 204/192.38 |
| 5,312,471 | 5/1994 | Jung | 65/71 |

FOREIGN PATENT DOCUMENTS 60-68303  4/1985  Japan ....................................... 65/407

Primary Examiner—John Hoffmann
Attorney, Agent, or Firm—Hill & Simpson

[57] ABSTRACT

To compensate for disturbing influences during arc welding of at least two optical waveguide fiber ends, an impedance of the discharge path of the arc is measured and at least one of the welding parameters is varied based on the measured impedance.

10 Claims, 3 Drawing Sheets

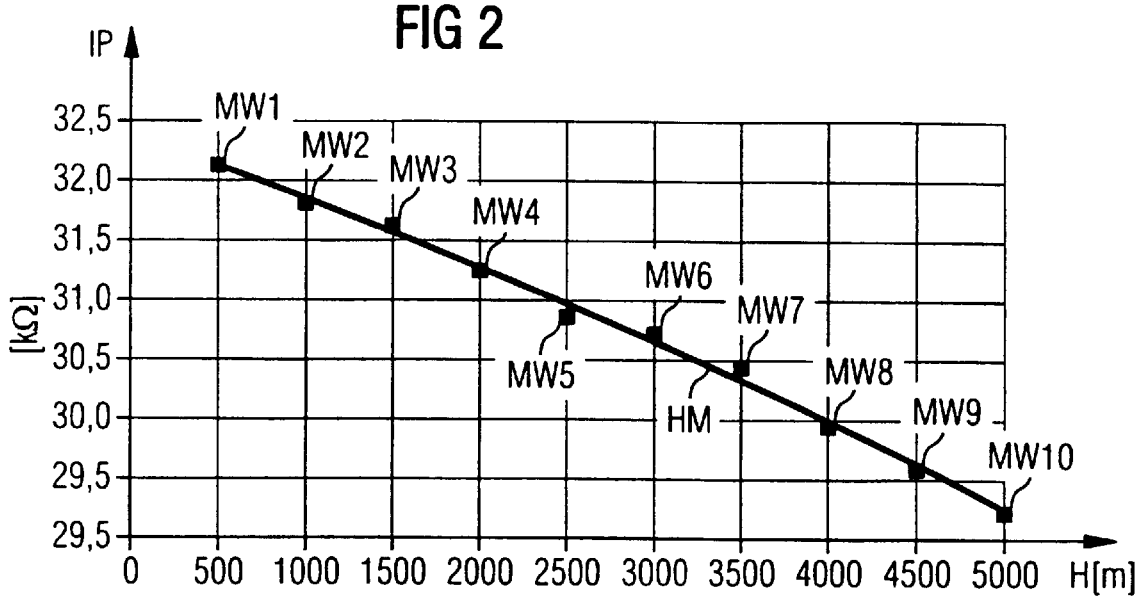
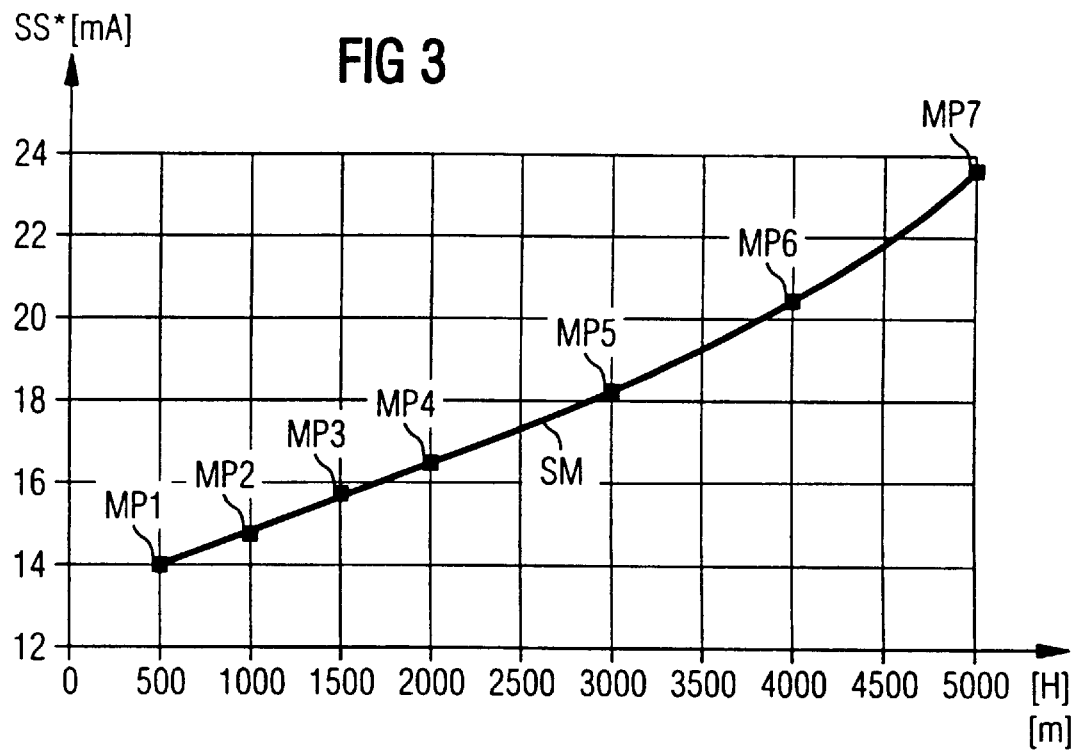

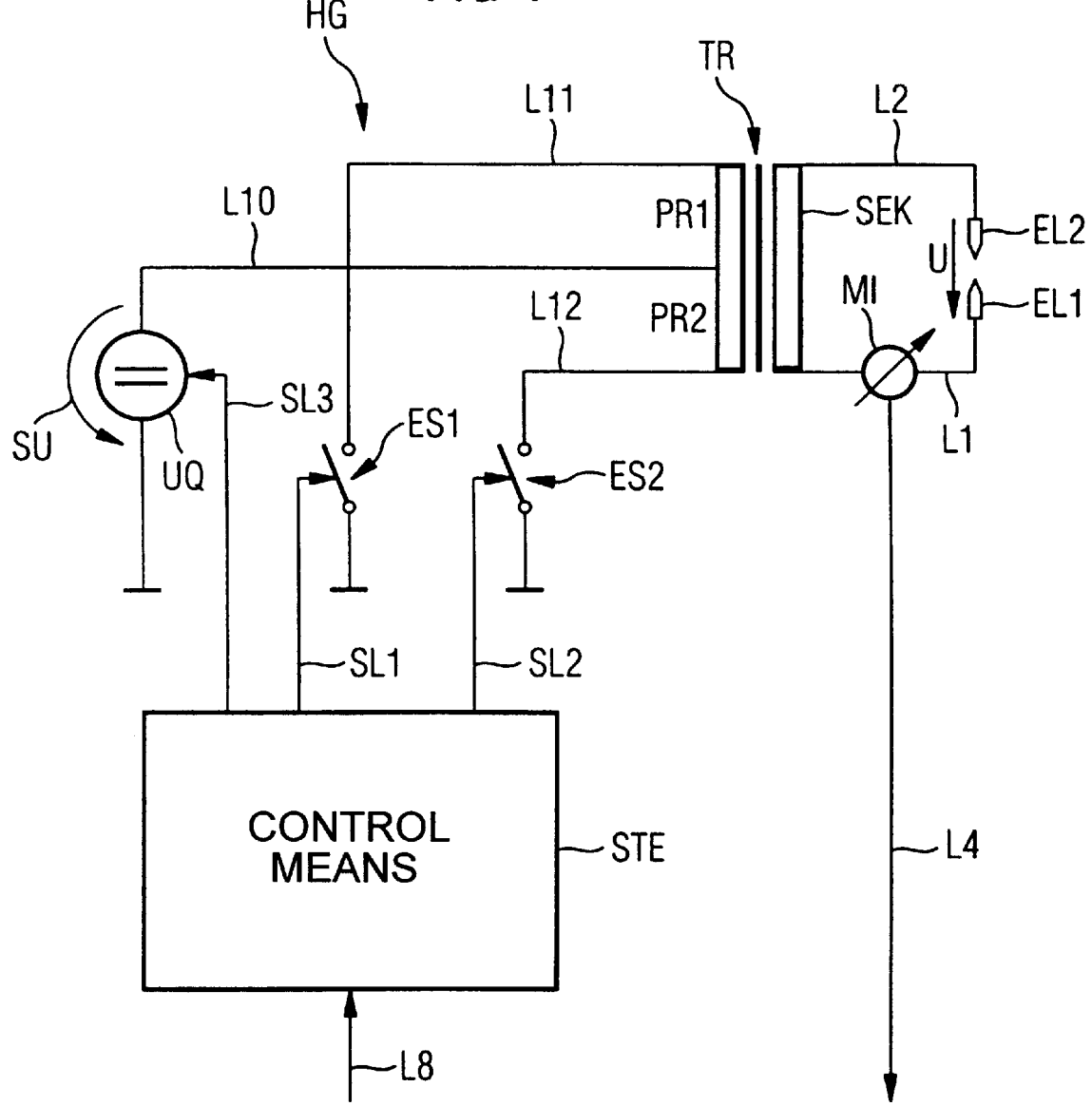

METHOD AND APPARATUS FOR CONNECTING TWO OPTICAL FIBERS BY ARC WELDING

BACKGROUND OF THE INVENTION

The invention is directed to a method for connecting the two ends of at least two optical fibers with an electrical arc that is generated between two electrodes and to an apparatus for performing the method.

U.S. Pat. No. 5,228,102, whose disclosure is incorporated herein by reference thereto and which claims priority from the same Japanese Application as EP-A1 0 504 519, discloses a light waveguide welding device wherein a pressure sensor is provided that generates a control signal dependent on the measured atmospheric pressure. The discharge current respectively applied is set to a predetermined value on the basis of the air pressure measured in this way. In addition to the considerable outlay for the pressure load cell as well as the control quantity to be derived therefrom, a disadvantage of this method is that the air pressure by itself does not represent the determining quantity for achieving an optimum welding process.

WO 95/24664 discloses a method for welding the ends of optical fibers wherein the manipulated quantities for the arc are selected so that the electrical power in the welding process itself is kept constant. To this end, a voltage, that is proportional to the respectively momentary power, is generated and this voltage is forwarded to a control means that varies an electrical actuator so that the power is kept essentially respectively constant during the welding process (specifically, during the burning time). This method also incorporates the possible quantities for determining a quality of the weld to an inadequate extent.

DE 41 19 654 A1 discloses an arc welding process wherein an arc is generated between the electrodes and a constant discharge current flows. During the arc welding, the voltage characteristic between the electrodes is registered dependent on the welding time. The welding process itself is aborted when a specific, voltage-dependent criterion of the voltage characteristic registered in this way has been reached. This method serves the purpose of achieving an automatic adaption of the welding parameters given different light waveguide types.

SUMMARY OF THE INVENTION

The invention is based on the object of undertaking the setting of welding parameters in an optimally simple way so that an optimally good weld that is largely independent of environmental or, respectively, ambient and/or apparatus influences is produced. In a method of the species initially cited, this object is achieved in that the impedance of the discharge path is measured; and in that at least one of the welding parameters is modified so that, on the basis of the measured impedance, a weld, which is optimum for the respective environmental conditions and/or for the respective apparatus condition, is achieved.

Environmental or, respectively, ambient influences (such as, for example, air pressure) and/or apparatus influences (such as, for example, electrode condition) can be taken largely into consideration and compensated for during the welding, as a result of this impedance measurement. In this way, the respectively two optical fiber ends can be welded faultlessly, i.e. effectively to one another under a number of practical conditions in a simple way.

The invention is also directed to an apparatus for connecting the two ends of at least two optical fibers with an electrical arc between two electrodes, which apparatus includes measuring means for determining the impedance of the discharge path and control means to modify at least one of the welding parameters so that, on the basis of the measured impedance, a weld connection or joint is achieved, which weld, joint or connection is optimum for the respective environmental conditions and/or for the respective apparatus condition.

Other advantages and features of the invention will be readily apparent from the following description of the preferred embodiments, the drawings and claims.

BRIEF DESCRIPTION OF THE DRAWINGS

FIG. 2 is a graph of measured impedance values of the glow discharge path of the welding apparatus according to FIG. 1 dependent on the altitude;

FIG. 3 is a graph of measured discharge current values of the welding apparatus of FIG. 1 that are required for the respectively same fiber heating at different altitudes; and FIG. 4 is a schematic circuit of a high-voltage generator for the welding apparatus of FIG. 1.

DESCRIPTION OF THE PREFERRED EMBODIMENTS

Figure 1:
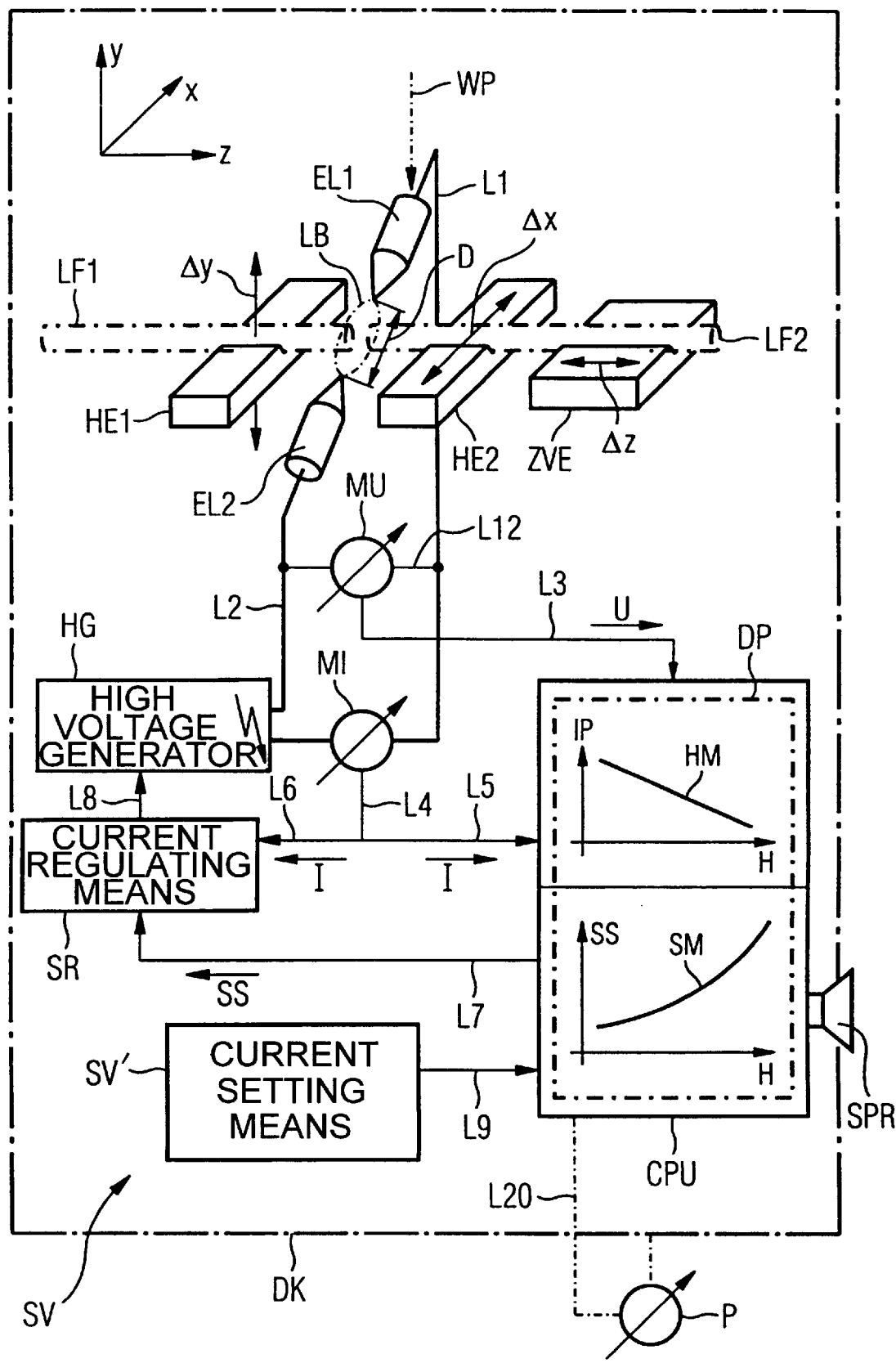
FIG. 1 is a schematically and partially perspective view of a basic structure of a welding apparatus for the implementation of the method of the present invention.

FIG. 1 schematically shows a welding apparatus SV that is a component part of a light waveguide welding apparatus. The apparatus comprises two holder means or manipulators HE1, HE2 which are positioned opposite one another and are of a known type. The manipulators HE1 and HE2 serve for the acceptance and attitudinal positioning of at least two optical fiber ends which are to be welded to one another. In FIG. 1, the holding means HE1 is provided for an optical fiber LF1 and the holding means HE2 is provided for an optical fiber LF2. The optical fibers are thereby indicated dot-dashed since they are not placed into the welding apparatus SV for the actual welding process until a later time. In order to be able to align the two ends of the two optical fibers LF1, LF2, which are residing opposite one another in a longitudinal direction, in an optimum alignment in a lateral direction (with reference to the longitudinal fiber axes) before they are welded, at least one of the two holding means HE1, HE2 is fashioned displaceable in at least one spatial direction transversely and preferably perpendicularly to the respective longitudinal fiber axis. It is assumed in the present example that the first holder means HE1 allows movement in y-direction and the second holding means HE2 allows movement in the x-direction of a Cartesian coordinate system x, y, z. The respective displacement motions in the x-direction and the y-direction are indicated by double arrows Δy and Δx. In order to move the ends of the two optical fibers LF1, LF2 toward one another for forming a welded connection and to be able to contact the ends to one another, the holding means HE2 in FIG. 1 additionally has a displacement unit ZVE allocated to it with which the optical fiber LF2 can be moved toward the optical fiber LF1 in the longitudinal fiber direction, i.e. in the z-direction. In addition to or independently thereof, the holding means HE1 of the first optical fiber LF1 can also potentially have a corresponding displacement unit allocated to it for displacement in the longitudinal fiber direction. The displacement motion in the z-direction is thereby indicated with a double-arrow Δz. The spatial directions z thus indicates a longitudinal direction along which each of the two fiber ends LF1, LF2 are to be aligned in alignment with one another.

As a critical component part, the welding apparatus SV comprises two electrodes EL1, EL2 that are arranged at a prescribable transverse spacing in the interspace between the two holding means HE1, HE2 and are arranged at opposite sides of the optical fibers LF1, FL2. A glow discharge arc LB can thus be formed along a discharge path D between the two electrodes EL1, EL2 trans-axially, particularly perpendicularly to the axial longitudinal course of the two optical fibers LF1, LF2. The course or path of the arc LB is indicated in dot-dashed lines.

For generating and feeding the glow discharge of the arc LB, the respective welding electrode EL1, EL2 are connected to a high-voltage generator HG via an appertaining current line L1, L2. This high-voltage generator HG supplies the voltage for igniting and supplies the power for maintaining the glow discharge between the two electrodes EL1, E12. (FIG. 4 shows a schematic diagram of this high-voltage generator in detail.)

If the respectively same, constant value of current were permanently, i.e. durably, set between the two electrodes EL1, EL2 for all welding processes with the assistance of the high-voltage generator HG for the glow discharge, then this value of current that had been determined once and set would be too high on some occasions and too low on other occasions given changing environmental or, respectively, ambient and/or apparatus influences. It has been found in extensive tests, namely, that the actual fiber heating is dependent not only on the current or, respectively, on the power of the glow discharge but can also be influenced by environmental or, respectively, ambient influences such as, for example, air pressure, ambient temperature, relative humidity, gas composition of the ambient air, etc., and/or by the apparatus conditions such as, for example, the electrode condition. Such disturbing influencing changes, which are dependent on location and time, would deteriorate the normal execution of the welding process for producing an optimum, thermal weld between two optical fibers since the fiber heating required for a faultless weld would be too high in some instances and too low in other instances.

In order to then enable a far-reaching compensation of these environmental or, respectively, ambient influences and/or of the apparatus condition for the respective welding process in an especially easy way, the electrical impedance of the discharge path D of the arc LB is advantageously acquired during the glow discharge process and at least one manipulated quantity for the correction of the disturbing influences on the glow discharge processes is derived from this measured impedance. At least one of the welding parameters such as, for example, welding current, welding power, welding time, etc., can then be advantageously modified with the assistance of this manipulative quantity so that an optimum welding result can be obtained for the respective environmental condition and/or for the respective condition of the welding apparatus. What is thereby advantageously exploited is that it is not only the fiber heating but also, in particular, the electrical impedance of the glow discharge path D that is dependent on the environmental or, respectively, ambient conditions and/or on the condition of the welding apparatus. The electrical impedance of the discharge path D is thereby a complex quantity. Investigations have shown that both the real part (equals ohmic part) as well as the imaginary part (equals inductive and capacitative parts) of the complex impedance are preferably mainly influenced by the following parameters individually or in arbitrary combination:

Environmental conditions (air pressure, temperature, humidity, gas composition of the ambient air);

Apparatus condition, particularly the type of electrodes and/or electrode conditions;

Intensity of the current of the glow discharge; and

Frequency spectrum of the glow discharge.

These multiple dependencies are particularly caused by the complex processes of a glow discharge (mainly by the life expectancy of the ions thereof). Since the ohmic part of the electrical impedance exhibits essentially the same dependencies on the environmental conditions and/or on the apparatus condition as the complex impedance, it is, in particularly, already sufficient to acquire only the ohmic impedance and to determine at least one corresponding control criterion for the optimum matching of the welding parameters to the respectively prevailing environmental and/or the apparatus conditions therefrom. The measurement outlay can thereby be quite substantially simplified and can be realized without great outlay. Moreover, the frequency spectrum and the intensity of the current of the glow discharge can be kept largely constant by a current regulating means SR allocated to the high-voltage generator HG, so that approximately the same conditions are always present with respect to these influencing quantities. With these simplifications, only a dependency of the ohmic impedance on the environmental conditions, for example air pressure, temperature, relative humidity and gas composition, and of the apparatus condition, for example the electrode condition, advantageously remains. The air pressure as well as the extent of the electrode contamination thereby particularly has by far the greatest influence on the value of the ohmic impedance of the discharge path D. Other environmental influences such as, for example, air temperature and relative humidity analogously, i.e. tendentiously, exhibit approximately the same behavior as the ohmic impedance but are significantly less pronounced, so that, in practice, they can usually be left out of consideration in a first approximation.

FIG. 2 shows the curve HM of the ohmic impedance IP measured at a practical discharge path such as, for example, D of FIG. 1 dependent on the location altitude H that, of course, is the principal determining factor for a specific atmospheric air pressure. An effective discharge current I of approximately mA was thereby prescribed for the glow discharge by way of example. For determining the measured impedance curve of FIG. 2, it is not necessary that the discharge current value thereby employed correspond to the later, actual welding current value. In order to avoid more pronounced imprecisions from the real conditions during the actual welding process, however, it is expedient to approximately set the actual welding current value. The registration of this impedance curve HM, which is dependent on the location altitude H above sea level, can, for example, ensue with the welding apparatus SV of FIG. 1 itself. In particular, no optical fibers are thereby placed into the welding apparatus SV in order to largely avoid any potential disturbances of the impedance measurement which would occur from the optical fibers. The electrode spacing between the two electrodes EL1, EL2 is thereby preferably permanently prescribed and corresponds to the discharge path length D for the actual welding process. The electrode spacing is preferably selected between 0.5 and 5 mm. For registering the impedance curve or, respectively, the measured curve HM, the welding apparatus SV of FIG. 1 is preferably introduced into a pressure chamber DK whose air pressure can be varied in a prescribable way for simulating different, allocated location altitudes. In FIG. 1, this pressure chamber DK with appertaining pressure indicator P is shown dot-dashed.

For determining the ohmic impedance IP of the discharge path D, the arc drop voltage U of the glow discharge arc is measured for the respectively prevailing air pressure in the pressure chamber DK and, thus, for the appertaining location altitude given a permanently prescribed, as yet not optimized discharge current I. The ohmic impedance IP is calculated from the values according to the ohmic law IP=U/I. For voltage measurement, a voltmeter means MU is connected between the two lines L1 and L2 of the electrodes EL1, EL2 with the assistance of a transverse line L12 in FIG. 1. The voltmeter means MU communicates the measured voltage values U to an evaluation/control means CPU via a line L3, the evaluation/control means CPU is preferably a component part of the light waveguide splicing apparatus. The evaluation/control means CPU calculates the impedance value given the assistance of the ohmic law from the respectively measured voltage value U and the permanently, i.e. constantly prescribed current value I. The pressure indicator P supplies the measured pressure values in conformity therewith to the evaluation/control means CPU via a signal line L20 indicated dot-dashed. Via a control line L7, the means CPU simultaneously forwards the desired rated value SS for the glow discharge current I to a current regulating means SR that correspondingly regulates the high-voltage generator HG via control line L8. For measuring the impedance curve HM of FIG. 2, the glow discharge current I is thereby preferably permanently set to a specific value, particularly to approximately 15 mA in the present measured example of FIG. 2. For determining the measured curve HM of FIG. 2, for example, ten impedance values MW1 through MW10 were respectively identified at intervals of 500 m difference in altitude. The respective altitude or, respectively, location altitude was thereby simulated by corresponding variation of the air pressure in the pressure chamber DK. By, for example, a function approximation, a straight line, which descends with increasing location altitude H, occurs as a common connecting line of the individual measured impedance values MW1 through MW10 in a first approximation. The ohmic impedance IP of the discharge path thus drops with dropping air pressure, which occurs for increasing location altitude H. Viewed in a first approximation, thus, the impedance IP linearly decreases with the increase in the altitude H.

These empirically measured impedance values as well as their appertaining altitude values can, for example, be permanently stored as value pairs in a table form in the evaluation/control means CPU of FIG. 1. It is especially expedient to indicate the impedance curve HM dependent on the altitude H as a continuous function and permanently deposit or, respectively, implement the equation thereof in the evaluation/control means CPU of FIG. 1. It can also be potentially possible to theoretically derive the relationship between the impedance IP and the altitude H and to specify a theoretically calculated equation for this, which, in particularly, can then be stored in the evaluation/control means CPU.

Other measuring means than the welding apparatus itself, of course, can also be utilized for the experimental measurement of the impedance values of curve HM dependent on the altitude.

The impedance curve HM dependent on the altitude or, respectively, location position H experimentally identified in this way is preferably stored or, respectively, implemented once in the evaluation/control means—particularly in terms of the equation—in order to have information about the interaction between impedance and air pressure available in the welding apparatus for error corrections of the welding parameters that are to be implemented later. This measured calibration curve HM is preferably already permanently deposited in the measured value memory of the evaluation/control means CPU in the factory.

The influencing of the ohmic impedance dependent on the degree of contamination of the electrodes can already be adequately taken into consideration for the desired error correction of disturbing quantities on the welding parameters, particularly in that the respective ohmic impedance is merely measured for the two electrode conditions of "dirty" and "clean". The following impedances were quantitatively measured for dirty as well as clean electrodes under the same conditions as for the impedance/altitude diagram IP/H of FIG. 2 as well as for an altitude of approximately 500 m.

TABLE 1

| Electrode Condition | Impedance in k$\Omega$ |
|---|---|
| Dirty | 32.6 |
| Clean | 32.0 |

An impedance difference of approximately 0.6 k$\Omega$ is thus present in the example between the measured impedances for dirty and clean electrodes. Thus deriving as a general relationship between electrode condition and impedance is that the impedance increases with an increasing electrode contamination.

It was also found by experiments that the actual fiber heating is preferably essentially determined by the following factors—in addition to the structure of the discharge path-:
Environmental conditions (air pressure, temperature, humidity, gas composition);
Electrode type and/or electrode condition; and
Intensity of the current of the glow discharge.

Apart from the frequency of the glow discharge, these are essentially the same factors that also mainly influence the impedance of the arc.

The relationship between the air pressure or, respectively, the allocated location altitude corresponding thereto and the fiber heating is investigated by way of the following example. Since the fiber heating or, respectively, fiber temperature can be measured in a direct way only with great outlay, it was not the respectively achieved fiber temperature for different altitudes but the electrical discharge current SS* that is required for the respectively same, optimum fiber heating in order to be able to produce a faultless splice that was measured. A separate experiment was preferably implemented therefor. The respective altitude was thereby simulated by corresponding variation of the air pressure in, for example, the pressure chamber DK of FIG. 1. At the respectively simulated altitude, respectively two optical fibers were placed into the splicing apparatus and welded to one another anew until a faultless splice, particularly a splice with a minimum transmission attenuation, was ultimately obtained between the fibers due to repeated variation of the discharge current. This optimum discharge current was then retained and registered for the respective altitude. A further calibration measuring method with which the respective fiber heating can be identified dependent on the altitude is particularly possible with the assistance of the offset splice method that is disclosed in copending U.S. Ser. No. 08/955, 405, which claims priority from DE-1 96 44 304.0. FIG. 3 schematically shows a discharge current/altitude diagram SS*/H registered in this way. The individual discharge current/altitude value pairs MP1 through MP7 were continuously joined to one another in FIG. 3 with, for example, an approximately acquired measured curve SM. The measured curve SM of FIG. 3 increases disproportionately with increasing altitude. A substantially higher electrical discharge current SS* is thus required for the same, optimum fiber heating given low air pressure, i.e. at a great altitude or, respectively, location height.

In particular, a similar effect occurs with respect to the electrode condition: for dirty electrodes, approximately the same fiber heating can already be obtained with a reduced welding current as given clean electrodes. In the present example of Table 1, the welding current is expediently reduced by approximately 1 mA given contaminated electrodes in order to obtain the same fiber heating as in the case of clean electrodes.

Viewed overall, the following relationships thus particularly occur from the registered measured curves of FIGS. 2 and 3:

The impedance of the discharge path is all the lower the lower the air pressure, i.e. the higher the altitude;

The fiber heating is all the lower the lower the air pressure;

The impedance of the discharge path is all the higher the more highly the electrodes are contaminated; and The fiber heating is also all the higher the more the electrodes are contaminated.

The influence of the air pressure or, respectively, of the altitude allocated thereto on the impedance is, in particular, thereby approximately just as pronounced as the influence thereof on the fiber heating. A change of the electrode condition that effects a specific change in impedance likewise has approximately the same influence on the fiber heating as a variation of the air pressure that effects the same change in impedance. What this means in other words is that, given the assistance of the measured curves of FIGS. 2 and 3—which initially show only the dependencies or, respectively, of the optimum welding current on the altitude—a corresponding correction factor given the presence of an electrode contamination can also be advantageously determined. This factor will be set later for the actual, later welding process for matching the welding process to the apparatus condition. The two measured curved of FIGS. 2 and 3 previously implemented in the welding apparatus already advantageously suffice by themselves for this. In particular, a permanently prescribed arrangement of the discharge path, a permanently prescribed frequency of the discharge and a permanently prescribed current are thereby respectively assumed.

It can be concluded from these relationships that the impedance of the discharge path can be utilized as a dependable criterion for the fiber heating. Direct conclusions about the fiber heating can thereby be advantageously drawn from the impedance, particularly with a given discharge current, defined frequency of the discharge as well as a permanently prescribed arrangement of the discharge path. Both environmental influences as well as the electrode condition can also be automatically taken into account.

In order to have information about the optimum rated welding current SS* (See FIG. 3) dependent on the altitude H available in the welding apparatus for later error corrections of the welding parameters, the measured curve SM is preferably permanently stored once as an equation (or, potentially, "digitized", i.e. its function values in tabular form with the appertaining altitudes) in the evaluation/control means CPU of FIG. 1. This implementation is preferably already undertaken in the factory.

The measured current values MP1 through MP7 of FIG. 3 or, respectively, the other current values of the identified discharge current curve SM found by interpolation indicate that rated discharge current SS* for the respective altitude at which an optimum, i.e. faultless welding of the two optical fibers can be achieved. The discharge current curve SM of FIG. 3 thus allocates that rated value SS* for the discharge current to the respective altitude H with which an optimum fiber heating, particularly minimum transmission attenuation can be achieved given adequate tensile strength at the same time. In this way, the measured current curve SM of FIG. 3 forms a type of calibration measured curve that provides optimum discharge current values SS* to be set for the respectively prevailing altitude in order to be able to produce an optimum splice.

In order to make the actual welding process largely independent of environmental or, respectively, ambient influences such as, in particular, from the air pressure in this example and/or from the electrode condition, the current impedance of the discharge path, which is exhibited under the momentarily established conditions of use as well as the current electrode condition, is measured with the assistance of the evaluation/control means CPU of FIG. 1. For determining the actual impedance of the discharge path, an ammeter means MI of a known type is inserted, for example, into the current line L1 for the first electrode EL1 in FIG. 1. The ammeter means MI is connected to the evaluation/control means CPU via a test line L4. Using the actual voltage U registered with the voltmeter means MU and the actual current I registered with the ammeter means MI, the evaluation/control means CPU then calculates the currently existing impedance of the discharge path D according to the ohmic law: IP=U/I. A specific altitude is unambiguously allocated to this identified actual impedance value with the assistance of the stored measured impedance curve HM of FIG. 2. The ideal, i.e. optimum rated welding current value SS* is obtained from the stored calibration measured curve SM according to FIG. 3 for this altitude. The evaluation/control means CPU then forwards this desired, optimum rated welding current value SS* (which is yet to be set) to the current-regulating means SR for the actual welding process that ensues later. This current-regulating means SR regulates the high-voltage generator HG so that a discharge current having the desired, optimum rated welding current value SS* flows for the glow discharge. The current-regulating means SR thereby compares the actual current value I, which is communicated to it from the ammeter means MI via the line L6, to the desired, rated welding current value SS*. Particularly from the difference in value between optimum rated and actual current, it generates a manipulated quantity for influencing the high-voltage generator HG so that the actual current is matched to the desired, optimum, rated welding current value SS*. Expressed in general terms, thus, measuring means such as, for example MU, MI are provided for determining the currently existing actual impedance IP of the discharge path D. Control means such as, for example, CPU, SR allocated to the measuring means then—on the basis of the measured actual impedance IP—modify at least one of the welding parameters of the welding apparatus SV, particularly the welding current, so that an optimum welding result can be achieved for the respective environmental conditions and/or for the respective apparatus condition.

When, for example, a current impedance value of 31 kΩ is identified for the discharge path, then the evaluation/control means CPU of FIG. 1 allocates an altitude of approximately 2500 m over NN (normal zero, i.e. above sea level) to this actual impedance value with the assistance of the value table or, respectively, diagram of FIG. 2. For this altitude, the evaluation/control means CPU takes the desired, optimum rated welding current value of approximately 17 mA from the table of FIG. 3 that is yet to be set for the actual welding process to be implemented later. The evaluation/control means CPU forwards this optimum rated welding current value by line L7 to the current-regulating means SR for error correction. When the electrodes are contaminated for this example, then an impedance of approximately 31.6 kΩ, which is an increase of approximately 0.6 kΩ, occurs and is allocated to a lower altitude of approximately 1500 m in FIG. 2. With the assistance of the diagram of FIG. 3, the evaluation/control means CPU assigns an optimum rated welding current value of approximately 16 mA to this altitude that is reduced by approximately 1 mA compared to the rated welding current value given clean electrodes. The additional influence of the electrode contamination is thus also automatically taken into account with the assistance of measured diagrams of FIGS. 2, 3.

Viewed in summary, the environmental and/or apparatus influences on the welding process can be taken into consideration so that the impedance of the discharge path is measured for the respectively given environmental and/or apparatus conditions and, based on this measured impedance, at least one of the welding parameters, particularly the discharge current here, is modified so that an optimum welding result is achieved for these given environmental and/or apparatus conditions. Conclusions about the environmental influences and/or apparatus influences (particularly, electrode contamination) are thus made based on the measured impedance of the discharge path and the deterioration of the welding process is eliminated by corresponding correction or, respectively adaptation of at least one welding parameter. What this means in other words, is that an error compensation for disturbing environmental influences and/or apparatus conditions is enabled for the actual welding process.

As warranted, the transfer of the actual current value to the evaluation/control means CPU can even be eliminated, since, of course, a rated measure current value can be permanently prescribed for the current-regulating means SR for the impedance measurement. This initial current value, which serves only for the impedance measurement, can thus be deposited as known in the evaluation/control means CPU. The current-regulating means SR then always regulates the high-voltage generator HG to this known, permanently prescribed rated measured current value for determining the actual impedance. The evaluation/control means CPU can thus calculate the current impedance IP of the discharge path merely by measuring the actual voltage U and from this known, permanently prescribed actual current value I that is equal to the rated measured current value as a result of the regulation. Only thereafter does the current-regulating means SR regulate the discharge current equal to the optimum rated welding current value SS*, which is obtained from the diagrams of FIGS. 2 and 3, for the actual welding process. In practice, thus, a corresponding matching of the welding parameters of the splicing apparatus to the respectively currently existing environmental conditions and/or to the apparatus condition is thus implemented first before every work employment of the splicing apparatus.

The error correction of this charge current can preferably ensue automatically with the assistance of the evaluation/control means CPU. As warranted, it can also be expedient to have the respective, optimum rated welding current value set manually by an operator. The evaluation/control means CPU can thereby show the user the rated welding current value required for an optimum weld via a display DP. As warranted, the user can also be merely informed of the measured actual impedance. From, for example, data sheets that are co-supplied that contain the two measured curves of FIGS. 3, 4, the user himself can then read the optimum welding current value that must be set. As warranted, further, the evaluation/control means CPU can also show the calibration measured curves of FIGS. 2 and 3 to the user with the assistance of a display DP, as schematically indicated in FIG. 1 within the schematically shown evaluation/control means CPU. In both instances, the user himself can describe, with the assistance of a current prescription or setting means SV', the optimum rated welding current value that is read or displayed on the evaluation/control means CPU. The evaluation/control means CPU is connected to the current setting means SV' via a control line L9.

The following procedures are expedient for the compensation of disturbing environmental/ambient influences on the welding process:

1. Separate Impedance Measurement:

To that end, the actual impedance of the discharge path is measured under the currently existing environmental conditions and/or the currently existing apparatus condition in advance, i.e. either directly after the light waveguide splicing apparatus is turned on or before the actual welding process or, respectfully, welding event at any, pre-set current—namely before the insertion of the optical fibers to be welded to one another into the splicing apparatus. What rated welding current value SS* is required in order to achieve the desired, optimum fiber heating is calculated from the result with the assistance of the calibration measured curves according to FIGS. 2 and 3 that are preferably registered once and retained or stored. This optimum welding current value is then set, particularly automatically with the assistance of the evaluation/control means CPU of FIG. 1. This procedure is particularly distinguished in that it can be realized in an especially simple way. A corresponding current correction factor (=SS*/I, i.e. optimum rated welding current value SS* divided by actual current value I) can be directly determined from the curves of FIGS. 2 and 3.

Advantageously, the actual current evaluation with the evaluation/control means can even be potentially eliminated for the impedance evaluation, since the current-regulating circuit SR can have a specific measured current value permanently prescribed, to which the current-regulating circuit SR always regulates for impedance measurement. Since the impedance measurement ensues in advance, however, subsequent modifications such as, for example, the electrode condition cannot be taken into consideration with this correction method. Since such changes normally occur only slowly, this prior correction of the discharge current is adequate under many practical conditions. As warranted, the impedance measurement can also be repeated from time to time or even before every individual splice.

2. Real-Time Impedance Measurement:

The impedance measurement ensues in real time, i.e. during the actual productive welding process. In order to enable an error correction, the relationships between impedance and altitude, rated welding current value and altitude according to FIGS. 2 and 3 are expediently identified in advance for all welding currents, into consideration and have been stored in the measured value memory of the splicing apparatus. The adaptation of the current can be undertaken either directly, i.e. during the on-going welding procedure, or gradually, i.e. only taking effect for following splices yet to be produced. Since the impedance is measured directly during the actual welding process, subsequent changes of the influencing quantities are advantageously taken into consideration. However, this correction cannot proceed on the basis of some permanently prescribed initial current value or, respectively, measured current value, since the welding current should already be adapted in a first approximation to the respective environmental conditions and/or to the apparatus condition in order to avoid damage to or deterioration of the optical fibers due to the measuring procedure for determining the impedance. In this real-time impedance measurement, the optical fibers to be welded to one another are already located in the arc. The changes of the impedance produced as a result thereof, however, are very slight in practice, so that they can be left out of the consideration.

3. Combined Method:

The impedance measurement is thereby implemented anew before the production of every splice. For reasons of practical execution, the optical fibers have already preferably been placed into the splicing apparatus. In order to avoid damage to or inadmissible deterioration of the optical fibers, the test current for determining the correct current correction factor is expediently selected so low that the optical fibers do not yet melt. The actual welding process can optionally ensue directly following the impedance measurement or after a cooling phase. Changes of the environmental/ambient conditions and/or of the apparatus condition can be taken into consideration better with the assistance of this correction method.

The test current for measuring the impedance of the discharge path is preferably selected in a range between 5 and 10 mA, and preferably is around 8 mA.

FIG. 4 schematically illustrates the structure of the high-voltage generator HG of FIG. 1 in detail. It comprises a transformer TR having the coil halves PR1, PR2 at the primary side as well as having the coil SEK at the secondary side. The two electrodes EL1, E12 are connected to the secondary side of the transformer via lines L1, L2. The voltage ratio between primary and secondary side is—in a first approximation—determined by the ratio of the numbers of turns of the primary and secondary coils and is thus constant. The transmission ratio between the respective primary coil PR1 or, respectively, PR2 and the secondary coil SEK is expediently selected so that a significantly higher voltage compared thereto is generated at the secondary side for operating the glow discharge arc from a relatively low voltage at the primary side. Since the transmission ratio between primary and secondary side is constant, the voltage at the primary side can approximately serve as criterion for the secondary voltage, i.e. it is not necessary to direct the measure of the actual voltage U between the two electrodes EL1, EL2. A DC voltage source UQ is connected to ground via a line L10 approximately in the middle of the primary winding. The input-side end as well as output-side end of the primary winding are connected via appertaining lines L11 or, respectively, L12 to electronic switches ES1 or, respectively, ES2 that are likewise connected to ground at one side. The two electronic switches ES1, ES2 are activated in alternation by a control means STE via control lines SL1, SL2 so that a current can flow alternately through either the upper or through the lower half of the primary winding, i.e. through the coil PR1, or PR2. As an end effect, an alternating voltage is obtained at the secondary side SEK. The control means STE is driven by the current-regulating means SR via the line L8. This current-regulating means SR of FIG. 1 receives information about the actual current via the line L6 (see FIG. 1) as well as about the respectively desired rated current value to be set via the control line L7 from the evaluation/control means CPU. By, for example, forming the difference between actual current value and rated current value, it prescribes a corresponding control signal for the control means STE that varies the primary voltage so that the respectively desired rated current value is set. To this end, the control circuit STE can, in particular, vary at least one of the following quantities individually or in combination:

1. Height of the Feed Voltage SU:

To that end, the control means STE drives the DC voltage source UQ via the control line SL3 and regulates the height of the feed voltage SU so that the desired rated current value is achieved. The on/pause ratio of the switches ES1, ES2 is thereby preferably selected to be constant, particularly approximately equal to 100%, i.e. one of the two switches is always closed.

2. On/Pause Ratio (=Pulse-Duty Ratio) Of The Switches ES1, ES2, which corresponds to a pulse-width regulation of the primary voltage with active and dead times:

To that end, the switches ES1, ES2 are correspondingly actuated via control lines SL1, SL2 proceeding from the control means STE, i.e. are closed and opened with such a pulse-duty ratio relative to one another that the required rated current value is achieved. The feed voltage SU is thereby preferably selected to be constant.

In both instances, the measurement of the primary voltage as a criterion for the secondary voltage is possible in a very simple way because the height of the feed voltage SU is directly proportional in a first approximation to the primary as well as secondary voltage taking effect; and the on/pause ratio of the switches ES1, ES2 is a criterion for the primary as well as secondary voltage taking effect.

The ohmic impedance of the discharge path can be directly determined from the primary voltage SU identified in this way, from the transmission ratio $\ddot{U}$ of the transformer TR and from the respectively prescribed current value I (=constant), being determined as:

$$IP = SU \cdot \ddot{U}/I$$

A significant, practical simplification for determining the impedance of the discharge path and for setting the respectively desired rated current value thus advantageously occurs. Namely, it is no longer necessary to explicitly calculate the impedance (of the discharge path) itself. Already sufficing instead of this is acquiring the required feed voltage—as a direct, impedance-dependent measured quantity—for a specific, desired value of current and/or the pulse width and/or the frequency for the primary voltage, i.e. the pulse-duty factor of the switches ES1, ES2 for a specific rated current value to be set.

Instead of impedance values, pulse-duty ratios of the switches ES1, ES2 or the height of the feed voltage SU dependent on the altitude H are then expediently entered along the ordinates of the diagram of FIG. 2. Given a predetermined test current, thus, the pulse-duty factors required therefor or the height of the feed voltage SU are stored once in the evaluation/control means dependent on the altitude H (as table or as function). Corresponding thereto, those feed voltage values and/or pulse-duty ratios that respectively produce the same, optimum fiber heating at various altitudes are determined for the measured diagram according to FIG. 3 so that the respectively desired rated, prescribed current is achieved, the pulse-duty factor of the switches ES1, ES2 and/or the height of the feed voltage SU are correspondingly regulated with the assistance of the control means STE.

Expressed generally, it thus advantageously suffices to acquire a single, other measured quantity instead of the impedance that is dependent on the impedance to an adequate extent. This substitute measured quantity is influenced in field use by environmental influences and/or by the electrode condition in the same way as is the impedance. A current correction factor that takes the influence of environmental influences and electrode condition on the fiber heating and on the impedance into consideration can therefore be determined for the respective substitute measured quantity in an analogous way from the diagrams of FIGS. 2, 3. The correction of the current ensues so that the disturbing influence of the environmental conditions and of the electric condition is compensated with respect to the fiber heating. The measured current value prescribed by the user or by the apparatus for determining the impedance or, respectively, the substitute quantity is converted into a corrected current with the assistance of the correction factor. This corrected current will achieve the same fiber heating under the actual conditions as the predetermined measured current rated value under normal conditions, i.e. clean electrodes, low altitude, dry air, etc. The conversion of the impedance or, respectively, measured quantity into a current or, respectively, current correction factor can optionally ensue in the following way:

On the basis of an empirically determined table;

On the basis of empirically determined equations; and

On the basis of theoretically determined equations.

As a further welding parameter, finally, the welding time can also be modified in order—on the basis of the measured impedance—to compensate disturbances in the welding process that can be produced by environmental influences and/or apparatus, particularly electrode conditions. When used with a predetermined measured current value for achieving an optimum welding result, the welding time is expediently selected to be longer with a greater altitude because that is allocated to the respective measured quantity (such as, for example, the actual welding current value I) with the assistance of FIGS. 2, 3.

In addition, it also possible to implement a regulation via the power instead of implementing the regulation of the glow discharge via the discharge current. References to the current in the preceding text of the specification are thereby to be replaced by the term "power". For correction of the environmental/apparatus influences, a comparison of actual power and rated welding power is analogously implemented and a power correction factor is determined therefrom. In FIG. 3, the measured, optimum rated welding power would be entered at the ordinates instead of the optimum rated welding current value SS*. Such a modified rated power/altitude diagram thereby exhibits a measured curve that is merely slightly distorted compared to the shape of the measured curve SM of FIG. 3. Corresponding thereto, a slight distortion would also occur for the measured curve HM of FIG. 2 due to the regulation of the power. When working with the welding power, the following relationships occur analogously to the disclosed correction example for the discharge current: the welding power that is required for generating the same, optimum fiber heating as under normal conditions increases with a dropping air pressure. The welding power required for achieving optimum welding results, namely, varies dependent on the environmental and/or apparatus influences.

In summary, the influence and environmental conditions, particularly mainly of the air pressure, is compensated in that, i.e. the welding result is made largely independent of the environmental conditions in that the impedance of the glow discharge path is measured and evaluated. No additional sensors, particularly pressure sensors, are required for this purpose. The evaluation of the measured impedance can thereby be implemented with components of traditional light waveguide splicing devices that are already present, i.e. the outlay for the implementation of the error correction of environmental influences to the actually achieved fiber heating can be implemented without additional costs. At the same time, the influence of dirty electrodes is also automatically taken into consideration, i.e. without having to implement separate, further correction measurements.

In addition to or independently of the compensation of disturbing environmental influences, particularly of the air pressure, the condition of the electrodes—particularly given a known air pressure or, respectively, known altitude—can also be potentially determined according to the same principle and this welding parameter can be corrected. This can be particularly expedient in order to be able to implement the described compensation of environmental influences, particularly of changes in air pressure, with adequate precision. When, namely, the electrodes are excessively contaminated, then it would be expedient to clean or replace them.

The functional relationship between the impedance and the altitude is preferably identified in the following way for determining the electrode condition, which represents a further welding parameter:

First, the curve of the impedance dependent on the altitude is determined, preferably in the factory. This can ensue as described with reference to FIG. 2. This measurement is thereby implemented with electrodes whose degree of contamination is just barely acceptable for good splicing results. A limit value curve similar to FIG. 2 occurs. This limit value curve represents the maximally allowable impedance dependent on the altitude for good splicing results. The curve thereby need preferably be identified only once and can then be permanently stored in a suitable form, for example as a value table or as a functional relationship, i.e. can be durably stored in the measured value memory of the evaluation/control means. The splicing apparatus are expediently delivered with this stored limit value curve, so that this limit value curve is permanently available during any field employment.

The actual impedance measurement for evaluating the current electrode condition during a field employment then preferably ensues in the following steps:

1. Determination of the air pressure: the actual air pressure or, respectively, the actual altitude at the time of the measurement can either be manually input (for example, given knowledge of the altitude from an altitude map) or can be automatically determined, for example with the assistance of a pressure sensor. What impedance value is maximally allowed for the respective altitude can now be read with this known air pressure value from the stored limit value curve.

2. Impedance measurement: the measurement of the impedance of the glow discharge ensues according to the way described with respect to FIGS. 2, 3, i.e. the impedance of the discharge path during the glow discharge is also measured in this case. This impedance is all the higher the more highly contaminated the electrodes are. The impedance thus represents a criterion for the degree of contamination or, respectively, wear of the electrodes.

3. Evaluation: when the measured impedance lies higher than an upper, allowable threshold that occurs for the respective air pressure from the limit value curve, an acoustic alarm signal is expediently output for the user, for example with a loudspeaker SPR at the evaluation/control means CPU or a corresponding alarm message is displayed (for example in the display DP of the evaluation/control means CPU of FIG. 1). In response thereto, the operator can clean or replace the electrodes. Potentially, this can also ensue automatically by the splicing apparatus itself. For example, the electrodes can thus be cleaned in a simple way in that a high arc drop voltage that burns the dirt particles off is applied to the electrodes over a longer time span. It can thus be assured in a simple way that the electrodes are always in an adequately good condition. Unnecessarily frequent prophylactic cleaning or replacement of the electrodes after a specific number of splices is thereby avoided.

The inventive method can be employed in all splicing apparatus for light waveguides that implement the fiber heating with electrical glow discharge. It is of no significance whether it is a matter of an apparatus for individual fibers or for a plurality of fibers and whether the apparatus has an x, y, z positioning available to it or works with stationary V-channels (i.e. without x-y-z positioning). Further components of the welding apparatus such as illumination and optics system, video cameras, video image processing means and the like are far less significance or even of no significance for the compensation method of environmental and ambient and/or apparatus influences. Therefore, they are not shown in FIG. 1 for the sake of clarity.

Although various minor modifications may be suggested by those versed in the art, it should be understood that we wish to embody within the scope of the patent granted hereon all such modifications as reasonably and properly come within the scope of our contribution to the art.

We claim:

1. In a method for connecting two ends of at least two optical fibers comprising generating an electrical arc between two electrodes, the improvements comprising measuring the impedance of the discharge path and modifying at least one welding parameter in response to the measured impedance so that an optimum welding result is obtained for the respective environmental conditions and/or the respective apparatus condition.

2. In a method according to claim 1, wherein the step of modifying varies a welding current as a welding parameter.

3. In a method according to claim 1, wherein the step of modifying varies the welding time as the welding parameter.

4. In a method according to claim 1, wherein the step of modifying varies the welding power as the welding parameter.

5. In a method according to claim 1, wherein the step of measuring the impedance is before the welding process and before insertion of the fibers into the welding apparatus.

6. In a method according to claim 1, wherein the step of measuring the impedance is before the actual welding process and after the insertion of the fibers into the splicing apparatus.

7. In a method according to claim 1, wherein the step of measuring the impedance is in real time during the welding process.

8. In a method according to claim 1, which includes taking prior measurements and real time measurements and then presetting a welding parameter based on the real time measurements and prior measurements.

9. In a method according to claim 1, wherein electrodes are cleaned and replaced as a welding parameter.

10. In a method according to claim 1, wherein the step of measuring the impedance is during the glow discharge event of the arc.

* * * * *